United States Patent [19]

Heron

[11] Patent Number: 4,836,377
[45] Date of Patent: Jun. 6, 1989

[54] COVER CLIP FOR PHOTOGRAPHIC SLIDES

[76] Inventor: Harold G. Heron, R.R. #3, Newcastle, Ontario, L0A 1H0, Canada

[21] Appl. No.: 154,018

[22] Filed: Feb. 9, 1988

[51] Int. Cl.⁴ .................. B65D 85/48; G03B 21/64
[52] U.S. Cl. ......................... 206/456; 40/158.1; 206/493
[58] Field of Search ............. 40/158 R, 158 B, 10 D, 40/156; 206/455, 456, 451, 449, 493

[56] References Cited

U.S. PATENT DOCUMENTS

| | | | |
|---|---|---|---|
| 781,222 | 1/1905 | Morse | 40/156 |
| 2,258,986 | 10/1941 | Hutchinson, Jr. | 40/158 B |
| 2,409,814 | 10/1946 | Vargish | 40/10 D |
| 2,603,017 | 7/1952 | Merrill | 40/156 |
| 2,958,971 | 11/1960 | Plettner | 40/156 |
| 3,081,870 | 3/1963 | Plettner | 206/456 |
| 3,553,864 | 1/1971 | Karlyn et al. | 40/10 D |
| 3,996,683 | 12/1976 | Hanlee | 40/158 B |

FOREIGN PATENT DOCUMENTS

| | | | |
|---|---|---|---|
| 2529546 | 1/1977 | Fed. Rep. of Germany | 40/10 D |
| 2092329 | 8/1982 | United Kingdom | 40/158 B |

Primary Examiner—Stephen Marcus
Assistant Examiner—Bryon Gehman
Attorney, Agent, or Firm—Fetherstonhaugh & Co.

[57] ABSTRACT

A clip for a photographic slide of the type having a photographic film set in a window of a mounting frame and wherein a recess extends inwardly from each side face of the mounting frame to the photographic film. The clip comprises a transparent folio having first and second oppositely disposed cover panels connected to one another along a spine so as to be normally urged toward one another to clamp a slide therebetween in use. A slide retaining detent projects from an inner face of at least one of said cover panels for releaseably engaging a slide to retain a slide within the folio in use.

16 Claims, 2 Drawing Sheets

COVER CLIP FOR PHOTOGRAPHIC SLIDES

FIELD OF INVENTION

This invention relates to a clip for photographic slides and a photographic slide assembly consisting of a clip and a photographic slide.

PRIOR ART

Photographic slides consist of a photographic film set in a window frame. The difficulty in handling photographic slides without soiling or damaging the photographic film is well known and attempts have been made to overcome these difficulties.

In one attempt to overcome the difficulties of the soiling of a photographic film, the film is removed from its mounting and placed between two glass slides which can be cleaned. This is a complex procedure which requires the careful laboratory techniques associated with the mounting of specimens on glass slides.

In order to protect a photographic slide without the need to modify the slide or remove the photographic film from its mounting, I provide a clip which is made from a transparent material which will fit over the slide and will retain the slide therein. This clip protects the photographic film while permitting most projectors to operate to project an image through the cover and slide so that the slide assembly can be used in a projector without removing the folio.

In order to retain a slide within the clip, I provide a detent on an inner face of the cover which extends into the recess formed in a side of the conventional slide through which the photographic film is visible.

For the purposes of ensuring that the slide is correctly located with respect to the clip, I provide two detents, one on one cover and one on the other cover. One of the detents is larger than the other so that it will only fit within the larger of the two recesses formed in a photographic slide.

According to one aspect of the present invention, there is provide a clip for a photographic slide of the type having a photographic film set in a window of a mounting frame and wherein a recess extends inwardly from each side face of the mounting frame to the photographic film, comprising a transparent folio having first and second oppositely disposed cover panels connected to one another along a spine so as to be normally urged toward one another to clamp a slide therebetween in use, slide retaining means on an inner face of at least one of said cover panels for releaseably engaging a slide to retain a slide within said folio in use.

According to a further aspect of the present invention, there is provided a photographic slide assembly comprising a photographic slide of the type having a photographic film set in a window of a mounting frame and wherein a recess extends inwardly from each side face of the mounting frame to said photographic film, a transparent folio having first and second oppositely disposed cover panels connected to one another along a spine so as to be normally urged toward one another to releaseably clamp said slide therebetween, slide retaining means on an inner face of at least one of said cover panels for releaseably engaging said slide to retain said slide within said folio.

The invention will be more clearly understood after reference to the following detailed specification read in conjunction with the drawings wherein.

Figure 3:
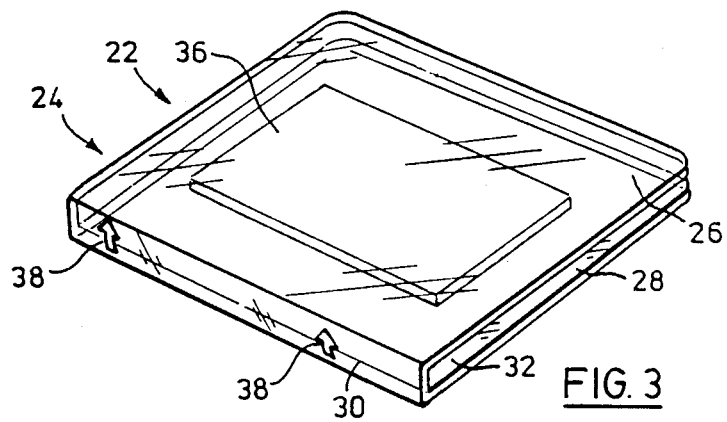
Figure 4:
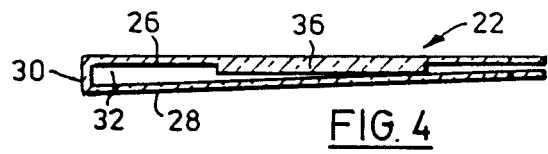
Figure 5:
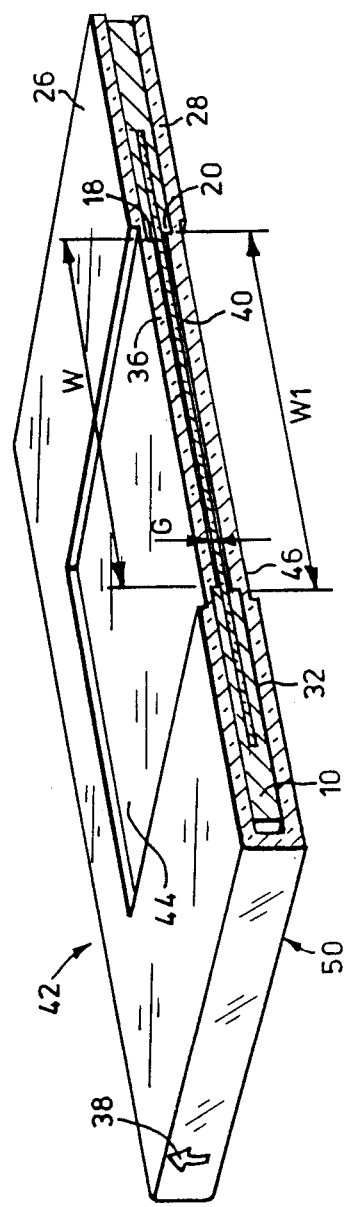
Figure 6:
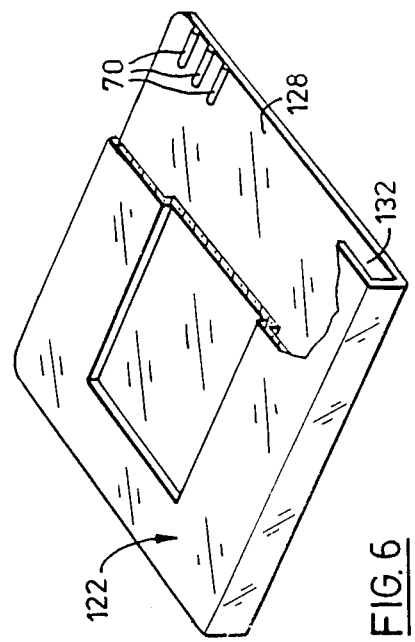

FIG. 3 is an asymmetric view of a clip constructed in accordance with an embodiment of the present invention, FIG. 4 is a sectional view taken along the line 4—4 of FIG. 3, FIG. 5 is a sectional view similar to FIG. 4 showing a photographic slide assembly in cross-section illustrating the manner in which a slide is mounted in a folio, FIG. 6 is an assymmetric view of a clip which incorporates an alternative slide retaining structure.

Figure 1:
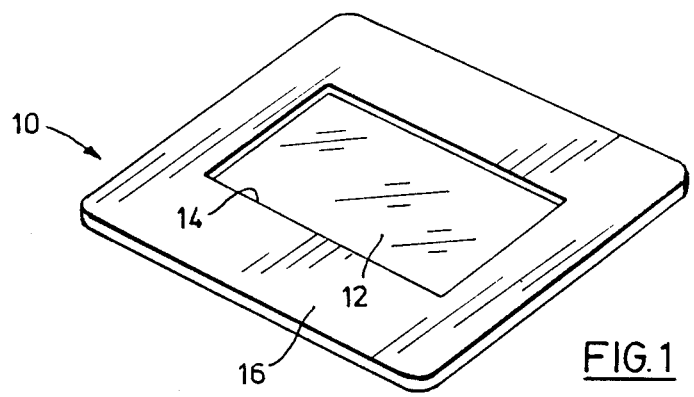
FIG. 1 is an asymmetric view of a photographic slide.

With reference to FIG. 1 of the drawings, the reference numeral 10 refers generally to a photographic slide which consists of a photographic film 12 which is set in a window 14 of a mounting frame 16. A first recess 18 extends inwardly from a first side of the frame 16 and a second recess 20 extends inwardly from the other side of the frame 16 to the exposed portion of the film 12. As is the common practice in many slides, the width W of the recess 18 is less than the width W1 of the recess 20. The height of the recess 18 is also smaller than the height of the recess 20 so that the cross-sectional area of the recess 18 is less than cross-sectional area of the recess 20. This feature is used to advantage in the clip of the present invention.

A clip in the form of a jacket for a photographic slide constructed in accordance with an embodiment of the present invention is illustrated in FIGS. 3 and 4 of the drawings. The clip is generally identified by the reference numeral 22 and consists of a unitary body of transparent plastics material in the form of a folio which is generally identified by the reference numeral 24 and which consists of first and second oppositely disposed cover panels 26 and 28 which are connected to one another by means of a spine 30. The covers 26 and 28 are proportioned so as to be substantially equal in width and height to the slide 10 which is to be mounted in the slide mounting channel 32 formed therebetween.

A slide retaining detent 36 is formed on the inner face of the cover panel 26 and is proportioned to fit in a close fitting relationship within the recess 18 of the slide which is to be mounted therein in use. As previously indicated the recess 18 is smaller than the recess 20 and consequently, by proportioning the detent 36 so that it will fit within the recess 18, it will be apparent that it will also fit within the recess 20.

Arrow markings 38 are formed on the outer edge of the spine 30 and serve to indicate the preferred direction of projection through the photographic slide assembly as will be described hereinafter.

When the clip 22 is in its relaxed configuration shown in FIGS. 3 and 4 of the drawings, the cover panels 26 and 28 converge in a direction away from the spine 30 The folio 24 is sufficiently flexible to permit the cover panels 26 and 28 to move away from one another to admit a slide to the channel 32 with ease and to withdraw the detent 36 from the recess 18 to permit removal of a slide with ease as required in use.

It will be noted that the cover panels 26 and 28 are proportioned so as to be substantially equal in width and height to the width and height of the photographic slide which is to be mounted therein so that a photographic slide assembly consisting of a photographic slide mounted in a cover may be mounted in a slide projector or slide storage magazine.

The plastics material from which the cover is manufactured is preferably of an optical quality which will permit the image carried by the photographic film to be projected through the clip without the need to remove the clip when the slide is to be used in a projector. A suitable plastics material for such an application is a thermoplastic material which is manufactured by Dow Chemical Canada Inc. and is identified by the trade mark TYRIL SAN. It will, however, be understood that a clip made from a transparent plastic material which is not optically suitable for use in a projector can be used to advantage in circumstances where the clip is to be removed before the slide is used in association with a projector. In these circumstances, the plastics material may be sufficiently transparent to permit the slide to be viewed to identify the image appearing thereon while offering protection to the slide during this type of handling.

Figure 2:
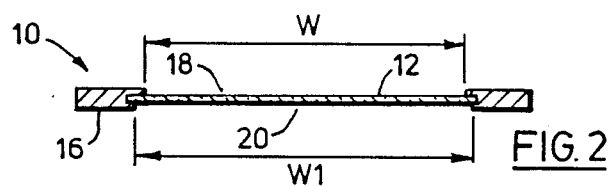
FIG. 2 is a sectional view taken along the line 2—2 of FIG. 1.

With reference to FIG. 5 of the drawings, the clip 42 is constructed in accordance with a further embodiment of the present invention in which a detent 40 is formed on the inner face of the second cover panel 28 in addition to the detent 36 which is formed on the first cover panel 26. In addition, recesses 44 and 46 are formed on the outer faces of the cover panels 26 and 28 respectively. The recesses 46 and 44 are proportioned so as to be slightly larger than the recesses 18 and 20 of the slide 10 (FIG. 2). The recesses 44 and 46 serve to reduce the thickness of the clip in the area of the window and thereby reduce optical distortion during projection.

As shown in FIG. 5 of the drawings, when slide 10 is mounted in the channel 32, a narrow gap G will be formed between the inner faces of the detents and the adjacent side face of the film. When the photographic slide assembly 50 consisting of the slide 10 and clip 42 are used in a projector, the fact that the inner faces of the detents 36 and 40 are located in close proximity to the surface of the film, ensures that if the film buckles or "pops" under the influence of the heat generated by the projector, the extent of buckling or distortion will be limited by the fact that the detents 36 and 38 serve to confine the film.

It will be noted that the detent 36 is proportioned to fit in a close fitting relationship within the recess 18 while the detent 40 is proportioned to fit in a close fitting relationship within the recess 20. As previously indicated, the recess 18 is smaller than the recess 20 and consequently, if the slide is incorrectly oriented such that the recess 18 of the slide is presented to the detent 40, the detent 40 cannot be seated and the fact that there has been a misalignment will be readily apparent to the user. The arrow markings 38 serve to indicate the preferred direction or projection when the slide 10 is correctly seated in the clip and consequently after the correct seating of the slide in the clip, it is merely necessary to examine the arrow markings in order to determine the manner in which the slide assembly should be mounted in a projector.

The clip of the present invention can be manufactured by an injection moulding process. It will be noted that the detents 36 and 40 are formed of a laminate. While it would be possible to manufacture a cover in which the detents are additional panels attached to the inner surface of the covers 26 and 28, this would form an additional interface which could interview with the projected image. In clips which are not intended to be used in a projector and which are removed before projection, the detents 36 and 40 may be formed separately from the cover panels and attached thereto.

An alternative slide retaining structure is illustrated in FIG. 6 of the drawings, wherein a series of ridges 70 are formed on the inner face of a cover panel 128 of a clip 122. In this embodiment, these ridges 70 together with additional ridges formed adjacent the other side edge of the cover 128 may serve to retain a slide in the mounting channel 132 of the clip 122 and thereby replace the detents. It will be apparent that this slide and clip which are illustrated and described above are used to project a horizontally elongated image, the clip of the present invention can also be used with slides which are arranged to project a vertically elongated image merely by rearranging the detents to align them with the recesses formed in the slides. These and other embodiments of the present invention will be apparent to those skilled in the art without departing from the scope of the invention.

I claim:

1. A photographic slide assembly comprising:
   (a) a photographic slide of the type having a photographic film set in a window of a mounting frame and wherein the window comprises first and second rectangular shaped recesses formed on opposite sides of the frame and each recess having side edges which extend inwardly from first and second side faces of the mounting frame to said photographic film,
   (b) a transparent folio having first and second oppositely disposed cover panels which are located in an overlapping face-to-face relationship and are each proportioned to completely cover the window of said photographic slide and thereby prevent direct contact with the photographic film during handling of the folio, said cover panels being connected to one another along a spine so as to be normally urged toward on another to releaseably clamp said slide therebetween,
   (c) rectangular shaped detent means projecting from an inner face of at least one of said cover panels toward the other of said panels, said rectangular shaped detent means being arranged on said inner face to mate with and proportioned to fit within one of said recesses of said slide in a closed fitting relationship and having side edges which are arranged to butt against the side edges of the recess in which the detent is located to releasably retain said slide in and prevent lateral movement of the slide relative to said folio when seated therein.

2. A photographic slide assembly as claimed in claim 1, wherein said detent means comprises first and second detents on the inner face of the first and second cover panels respectively which are arranged to fit in register within said first and second recesses respectively, said first and second detent means being arranged or proportioned with respect to one another to be out of register with the second and first recesses if a slide is incorrectly inserted into a cover with its first recess facing the second detent thereby to prevent incorrect orientation of a slide.

3. A photographic slide assembly as claimed in claim 1, wherein said detent is formed integrally with the cover on which it is located.

4. A photographic slide assembly as claimed in claim 1, wherein said panels and spine are sufficiently flexible to bend to permit said slide to fit between said detents and to permit the detents to be unseated from the recesses to facilitate removal of the slide from the folio.

5. A photographic slide assembly as claimed in claim 1, wherein said transparent folio is made from a transparent plastics material which is capable of transmitting a photographic image with minimal distortion.

6. A clip for a photographic slide of the type having a photographic film set in a window of a mounting frame and wherein first and second side recesses extend inwardly from first and second side faces of the mounting frame to the photographic film, comprising;
   (a) a transparent folio having first and second oppositely disposed cover panels connected to one another along a spine so as to be normally urged toward one another to clamp said slide therebetween in use,
   (b) first and second detent means on the inner face of the first and second cover panels and arranged to fit in register within said first and second recesses respectively when said slide is seated in said folio, said first and second detent means being arranged and proportioned with respect to one another to be out of register with the second and first recesses if said slide is incorrectly inserted into a cover with its first recess facing the second detent thereby to prevent incorrect orientation of said slide in the clip in use.

7. A clip as claimed in claim 6 wherein said first and second detent means are formed integrally with the first and second cover panels respectively.

8. A clip as claimed in claim 7, wherein said first and second detent means are proportioned to fit in a close fitting relationship within said first and second recesses respectively.

9. A clip for a photographic slide of the type having a photographic film set in a window of a mounting frame and wherein the window comprises first and second rectangular shaped recesses formed on opposite side of the frame and each recess having side edges which extend inwardly from first and second side faces of the mounting frame to the photographic film, comprising:
   (a) a transparent folio having first and second oppositely disposed cover panels which are located in an overlapping face-to-face relationship and are each proportioned to completely cover the window of said photographic slide and thereby prevent direct contact with the photographic film during handling of the folio, said cover panels being connected to one another along a spine so as to be normally urged toward one another to clamp said slide therebetween in use,
   (b) rectangular shaped detent means on an inner face of at least one of said cover panels and projecting toward the other of said panels, said rectangular shaped detent means being arranged on said inner face to mate with and proportioned to fit within one of said recesses of said slide in a close fitting relationship and having side edges which are arranged to butt against the side edges of the recess in which the detent is located to releasably retain said slide in and prevent lateral movement of the slide relative to said folio when seated therein.

10. A clip for a photographic slide as claimed in claim 1 wherein the recesses which are formed on opposite sides of the slide consist of a first recess and a second recess which are of different sizes to one another and wherein said detent means comprises;
    (a) a first and second detents on the inner face of the first and second cover panels respectively, said first and second detent being arranged to fit in register within said first and second recesses respectively when said slide is seated in said folio said first and second detent means being arranged and proportioned with respect to one another to be out of register with the second and first recesses if said slide is incorrectly inserted into a cover with its first recess facing the second detent thereby to prevent incorrect orientation of said slide in the clip in use.

11. A clip as claimed in claim 9 wherein said detent means is formed integrally with the cover on which it is located.

12. A clip as claimed in claim 9 wherein said panels and spine are sufficiently flexible to bend to permit said slide to fit between or be removed from the covers of the folio in use.

13. A clip as claimed in claim 9 wherein said transparent folio is formed from a transparent plastic material through which the image of the slide may be projected with minimal distortion.

14. A photographic slide assembly comprising;
    (a) a photographic slide of the type having a photographic film set in a window of a mounting frame and wherein first and second side recesses extend inwardly from first and second side faces of the mounting frame to said photographic film,
    (b) a transparent folio having first and second oppositely disposed cover panels connected to one another along a spine so as to be normally urged toward one another to releaseably clamp said slide therebetween,
    (c) first and second detent means on the inner face of the first and second cover panels and arranged to fit in register within first and second recesses of said mounting frame respectively, said first and second detent means being arranged and proportioned with respect to one another to be out of register with the second and first recesses if said slide is incorrectly inserted into a cover with its first recess facing the second detent thereby to prevent incorrect orientation of said slide.

15. A photographic slide assembly as claimed in claim 14, wherein said first and second detent means are formed integrally with said first and second cover panels respectively.

16. A photographic slide assembly as claimed in claim 14, wherein said first and second detent means are proportioned to fit in a closed fitting relationship within said first and second recesses respectively.

* * * * *